(12) United States Patent
Towsley

(10) Patent No.: US 7,393,446 B2
(45) Date of Patent: Jul. 1, 2008

(54) CELLULAR METAL STRUCTURE

(75) Inventor: Frank E. Towsley, 301 Richard Ct., Midland, MI (US) 48640

(73) Assignee: Frank E. Towsley, Midland, MI (US)

( * ) Notice: Subject to any disclaimer, the term of this patent is extended or adjusted under 35 U.S.C. 154(b) by 701 days.

(21) Appl. No.: 10/793,996

(22) Filed: Mar. 5, 2004

(65) Prior Publication Data

US 2005/0194254 A1 Sep. 8, 2005

(51) Int. Cl.
*C25D 15/00* (2006.01)
(52) U.S. Cl. ........................................ 205/109
(58) Field of Classification Search ............... 205/80, 205/118, 122, 135, 136, 109
See application file for complete search history.

(56) References Cited

U.S. PATENT DOCUMENTS

| 4,053,371 | A | 10/1977 | Towsley |
| 4,076,888 | A | 2/1978 | Perugini |
| 4,121,992 | A | 10/1978 | Towsley |
| 4,251,603 | A | * | 2/1981 | Matsumoto et al. ........... 429/94 |
| 4,957,543 | A | * | 9/1990 | Babjak et al. ................ 148/525 |
| 5,738,907 | A | | 4/1998 | Vaccaro |
| 5,935,429 | A | | 8/1999 | Liao |
| 6,315,040 | B1 | | 11/2001 | Donnelly |
| 6,318,565 | B1 | | 11/2001 | Diemer |
| 6,679,384 | B1 | | 1/2004 | Serres |
| 6,881,234 | B2 | * | 4/2005 | Towsley ..................... 29/623.5 |

OTHER PUBLICATIONS

Gregor, Primer on Metal Filtration Media, 2003.
Ashby, Metal Foams: A Design Guide p. 1-27, 40-45, 226; 2000; SAE.

* cited by examiner

*Primary Examiner*—Nam X Nguyen
*Assistant Examiner*—Luan V Van
(74) *Attorney, Agent, or Firm*—Timothy S. Stevens

(57) ABSTRACT

A porous metal structure having a continuous metal phase intermingled with a continuous tortuous porous phase. The continuous tortuous porous phase can be made to terminate at a surface of the porous metal structure with elongated pores. The porous metal structure can be made to have a bulk density divided by the density of the metal of from, for example, 0.99 to 0.01. Such structures can be made by electrodepositing a metal in the interstitial spaces of a polymer foam and by electroforming a metal in the interstitial spaces of a stretched porous structure of sintered polymer beads.

3 Claims, 14 Drawing Sheets

CELLULAR METAL STRUCTURE

BACKGROUND

The instant invention is in the field of porous metal structures. More specifically, the instant invention relates to porous metal structures having elongated pores and/or porous metal structures having relatively high density and methods for producing such structures.

A number of metal foam structures have been reported; see, for example the text book by Ashby et al., Metal Foams, A Design Guide, 2000, ISBN 0-7680-0555-8. Metal foams are characterized as having open cell topology or closed cell topology. The metal of either structure is a continuous phase. The cells of the closed cell structure are a discontinuous phase entrapped in the continuous metal phase. The cells of the open cell structure are interconnected to form a continuous tortuous phase intermingled with the continuous metal phase.

Open cell porous metal structures to be used, for example, as substrates for battery electrodes can be made by depositing a metal (such as nickel) onto the surfaces of an open cell polymer foam preform (usually open cell polyurethane foam) followed by vaporization of the polymer, see, for example, U.S. Pat. Nos. 4,076,888; 4,957,543; and 5,738,907. The '907 patent pointed out that the pores of such open cell porous metal structures tend to be somewhat oval in shape but can be made to be more isotropic (not unlike the combination of a circle and a polygon) by appropriate stretching of the open cell polymer foam preform in a direction transverse to the direction of production of the foam.

The cell size of open cell porous metal structures ranges from about 0.1 millimeter to about 2 millimeters, Ashby, supra. The relative density (relative to solid metal) of open cell porous metal structures ranges from as low as 0.02 to about 0.25, Ashby, supra. The relative density of sintered metal structures (such as sintered bronze bearings) ranges from about 0.6 to about 0.88.

In 1977 Frank E. Towsley was granted a patent on a unique open cell porous metal structure made, for example, by electrodepositing a metal in the interstitial spaces of a compacted bed of polystyrene particles followed by dissolution of the polystyrene, see U.S. Pat. No. 4,053,371, herein fully incorporated by reference.

Towsley used such a porous cellular metal, for example, in an improved electrolytic cell; see U.S. Pat. No. 4,121,992, herein fully incorporated by reference. Towsley suggested a number of other applications such as a filtration membrane, an electrode assembly for batteries, lightweight structural members, impact energy absorbers, and abrasive grinding combinations.

The cell diameter of Towsley's open cell porous metal structure can be relatively small (for example, 0.0001 millimeter) to relatively large (for example, 1 millimeter or more) depending of the diameter of the polystyrene particles used. The relative density of Towsley's open cell porous metal structure ranged from about 0.01 to about 0.5.

The aspect ratio of an anisotropic pore of an open cell porous metal structure is the ratio of the larger diameter of the pore divided by the smaller diameter of the pore. Due primarily to surface tension forces, the pores of open cell porous metal structures tend to be generally spherical in shape. However, it would be an advance in the art of open cell porous metal structures if the aspect ratio of the pores were greater than 1.5. For example, pores having an aspect ratio of greater than 1.5 (at least at the surface of the filter) are preferred for filtering particulate materials from fluids so that the filtered particulate does not blind or block the pore. In addition, it would be an advance in the art if the relative density (relative to solid metal) of open cell porous metal structures could be increased over prior art structures.

SUMMARY OF THE INVENTION

The instant invention is a porous metal structure comprising a continuous metal phase intermingled with a continuous tortuous porous phase terminating at a surface of the porous metal structure with anisotropic pores having a maximum pore diameter and a minimum pore diameter, the average ratio of the maximum pore diameter to the minimum pore diameter being greater than 1.5. The bulk density of the structure divided by the density of the metal can range from as low as 0.01 or lower to as high as 0.99 or higher. In another embodiment, the instant invention is a porous metal structure comprising a continuous metal phase intermingled with a continuous tortuous porous phase wherein the bulk density of the structure divided by the density of the metal is greater than 0.9.

The instant invention is also a method for making a porous metal structure comprising a continuous metal phase intermingled with a continuous tortuous porous phase terminating at a surface of the porous metal structure with anisotropic pores having a maximum pore diameter and a minimum pore diameter, the average ratio of the maximum pore diameter to the minimum pore diameter being greater than 1.5. The method comprises four steps. The first step is to place an aqueous solution of an electrolyte in the interstitial spaces of a substantially electrically nonconductive open cell polymer structure, the electrolyte suitable for the electrolytic deposition of a metal. The second step is to position the open cell polymer structure containing the electrolyte in an electrolytic cell so that at least a portion of the open cell polymer structure containing the electrolyte is in compression contact with the cathode of the electrolytic cell. The third step is to apply a direct current potential between the anode of the electrolytic cell and the cathode of the electrolytic cell to electrolytically deposit a continuous network of metal in the interstitial spaces of the open cell polymer structure, the network being deposited progressively starting from the cathode of the electrolytic cell and extending toward the anode of the electrolytic cell to form a structure comprising a continuous metal phase and a continuous polymer phase. The fourth step is to remove the polymer of the continuous polymer phase to form the porous metal structure. The bulk density of the structure divided by the density of the metal tends to be relatively high, e.g., 0.9 to 0.99, using this embodiment.

In another embodiment, the instant invention is a method for making a porous metal structure comprising a continuous metal phase intermingled with a continuous tortuous porous phase terminating at a surface of the porous metal structure with anisotropic pores having a maximum pore diameter and a minimum pore diameter, the average ratio of the maximum pore diameter to the minimum pore diameter being greater than 1.5 comprising six steps. The first step is to compact an array of substantially convex, substantially electrically nonconductive elastic particles of a polymer to sinter the particles together to form a porous preform structure defining interconnected interstitial spaces. The second step is to stretch the porous preform structure to more than 150 percent of its original length dimension to form a stretched preform structure. The third step is to place an aqueous solution of an electrolyte in the interstitial spaces of the stretched preform structure, the electrolyte suitable for the electrolytic deposition of a metal. The fourth step is to position the stretched preform structure containing the electrolyte in an electrolytic cell so that at least a portion of the stretched preform structure containing the electrolyte is in contact with the cathode of the electrolytic cell. The fifth step is to apply a direct current potential between the anode of the electrolytic cell and the cathode of the electrolytic cell to electrolytically deposit a continuous network of metal in the interstitial spaces of the stretched preform structure, the network being deposited progressively starting from the cathode of the electrolytic cell and extending toward the anode of the electrolytic cell. The sixth step is to remove the polymer of the continuous polymer phase to form the porous metal structure. The bulk density of the structure divided by the density of the metal tends to be lower, e.g., 0.01 to 0.5, using this embodiment.

In yet another embodiment, the instant invention is a method for making a porous metal structure having a bulk density divided by the density of the metal of greater than 0.6. The method comprises four steps. The first step is to place an aqueous solution of an electrolyte in the interstitial spaces of a substantially electrically nonconductive open cell polymer structure, the electrolyte suitable for the electrolytic deposition of a metal. The second step is to position the open cell polymer structure containing the electrolyte in an electrolytic cell so that at least a portion of the open cell polymer structure containing the electrolyte is in contact with the cathode of the electrolytic cell. The third step is to apply a direct current potential between the anode of the electrolytic cell and the cathode of the electrolytic cell to electrolytically deposit a continuous network of metal in the interstitial spaces of the open cell polymer structure, the network being deposited progressively starting from the cathode of the electrolytic cell and extending toward the anode of the electrolytic cell to form a structure comprising a continuous metal phase and a continuous polymer phase. The fourth step is to remove the polymer of the continuous polymer phase to form the porous metal structure.

DETAILED DESCRIPTION OF THE INVENTION

Figure 1A:
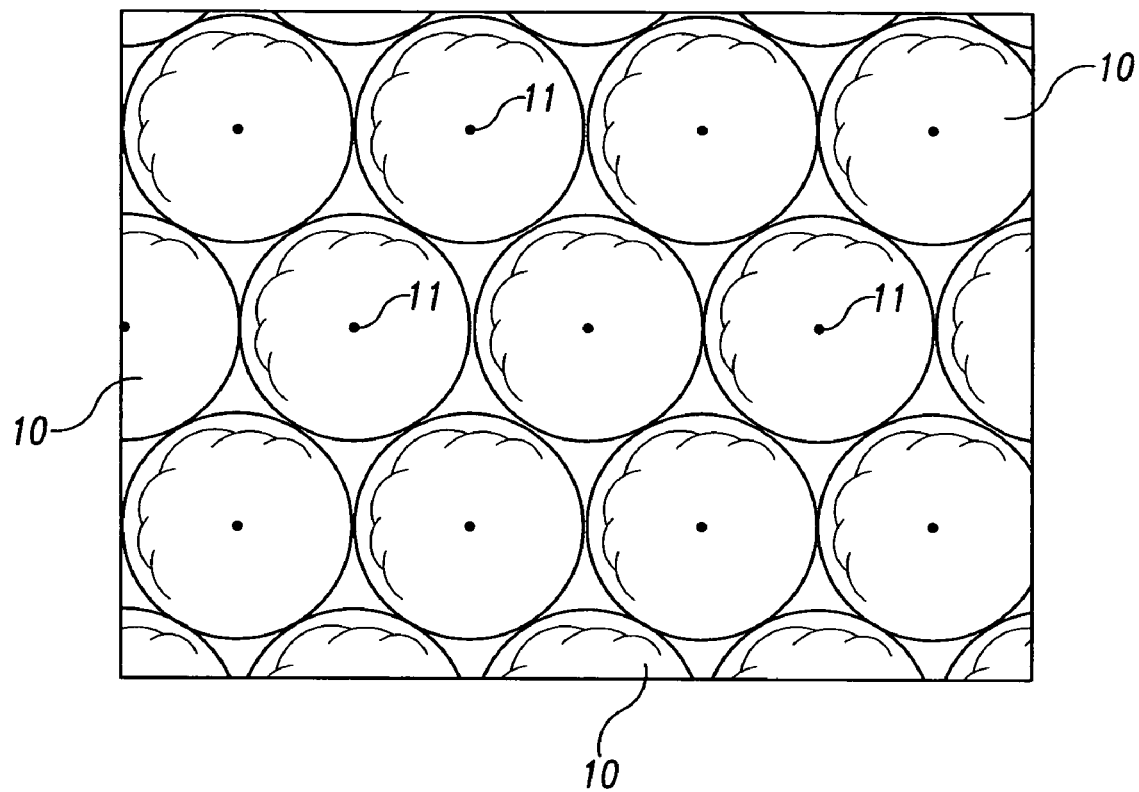
FIG. 1A is a microscopic view of an array of polystyrene microspheres.
Figure 1B:
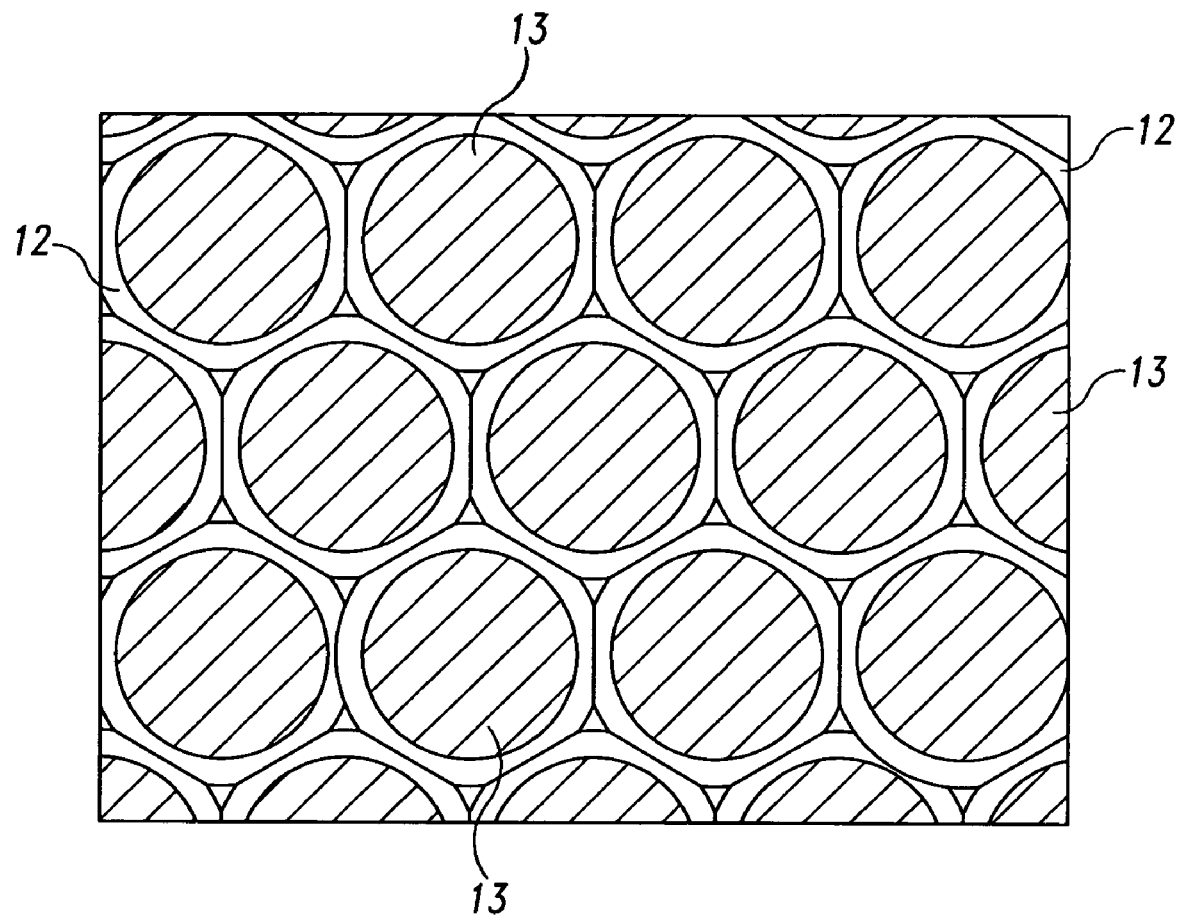
FIG. 1B is a microscopic view of an array of heated and compacted polystyrene microspheres to sinter the polystyrene microspheres together to form a porous preform structure.
Figure 1C:
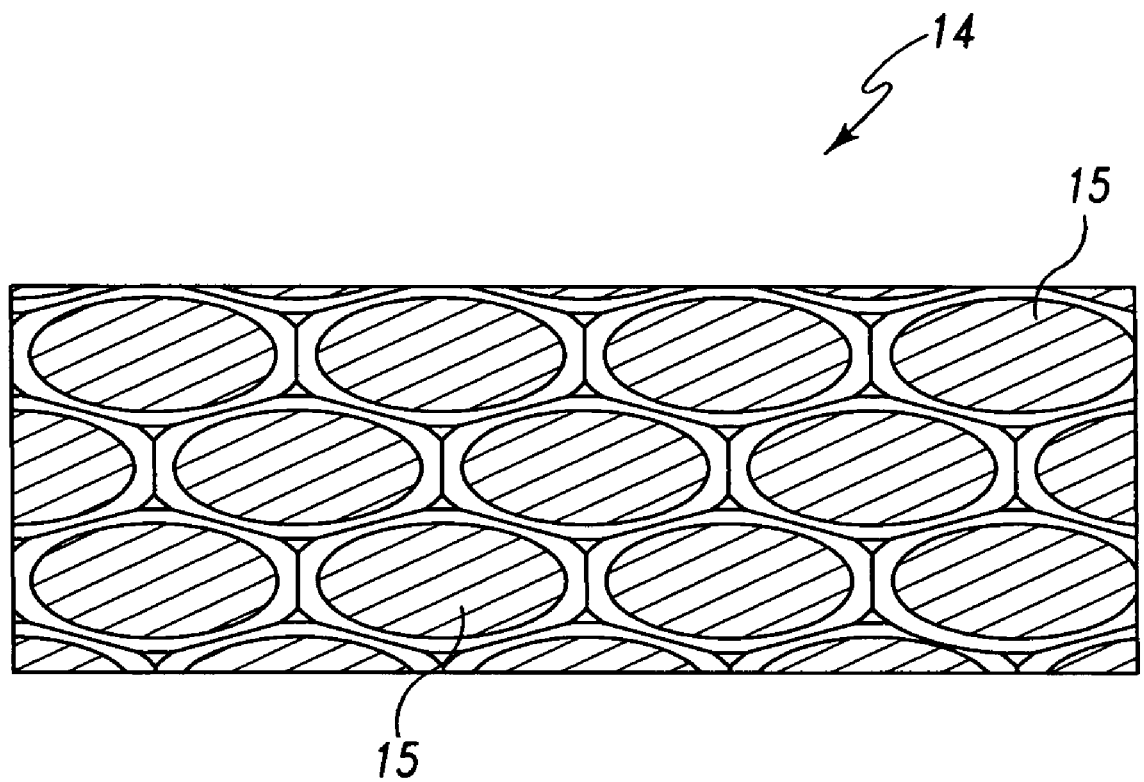
FIG. 1C is a microscopic view of the preform structure of FIG. 1B after it has been stretched to 200 percent of its original length dimension.

Referring now to FIG. 1A, therein is shown a microscopic view of an array of polystyrene microspheres (available, for example, from Gerlinde Kisker, Steinfurt, Germany) as viewed through a glass plate, not shown. The polystyrene microspheres contact the glass plate at the contact points 11. Referring now to FIG. 1B, therein is shown a microscopic view of the array of FIG. 1A after the array has been heated to 95 degrees Celsius followed by compaction to sinter the polystyrene microspheres together to form a porous preform structure as viewed through a glass plate, not shown. The polystyrene preform structure 12 shows contact areas 13 resulting from compression of the original polystyrene microspheres against the glass plate. Referring now to FIG. 1C, therein is shown a microscopic view of the preform structure of FIG. 2 after it has been stretched to 200 percent of its original length dimension to form a stretched preform structure 14 having an oval shaped contact areas 15.

Figure 1D:
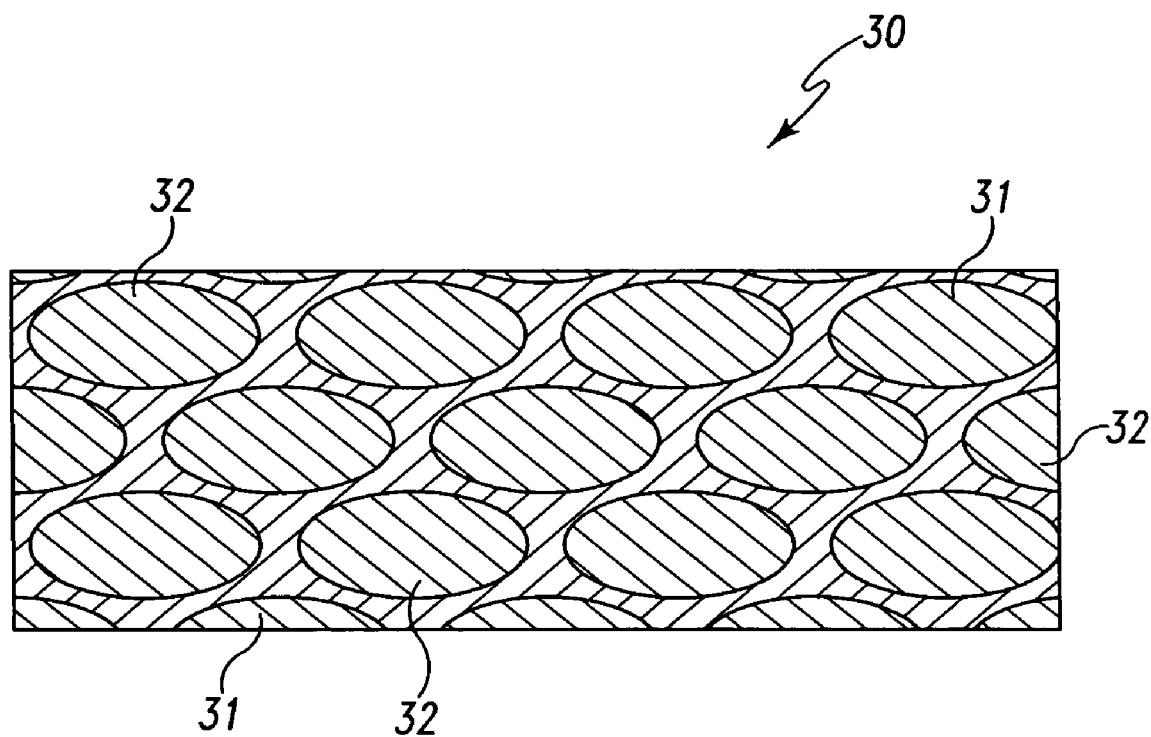
FIG. 1D is a microscopic view of the preform structure of FIG. 1C wherein the interstitial spaces of the preform structure are filled with an electrodeposited metal.
Figure 1E:
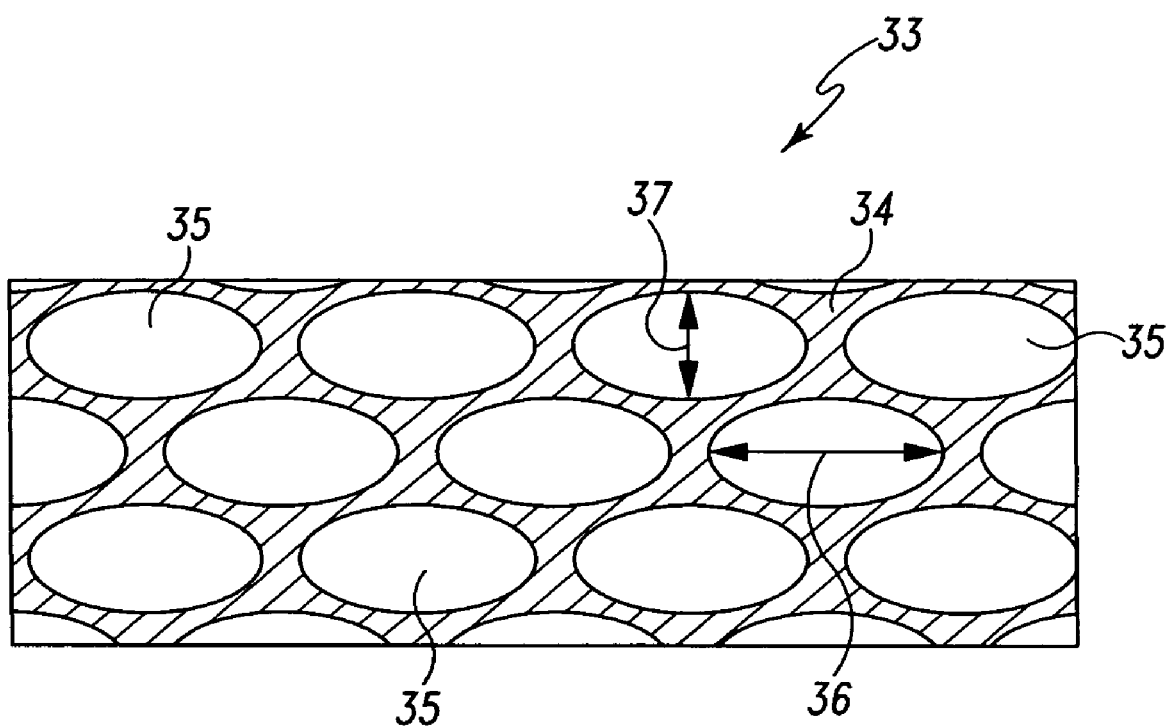
FIG. 1E is a microscopic view of the structure of FIG. 1D after removal of the polystyrene therefrom to produce a porous metal structure of the instant invention.
Figure 4A:
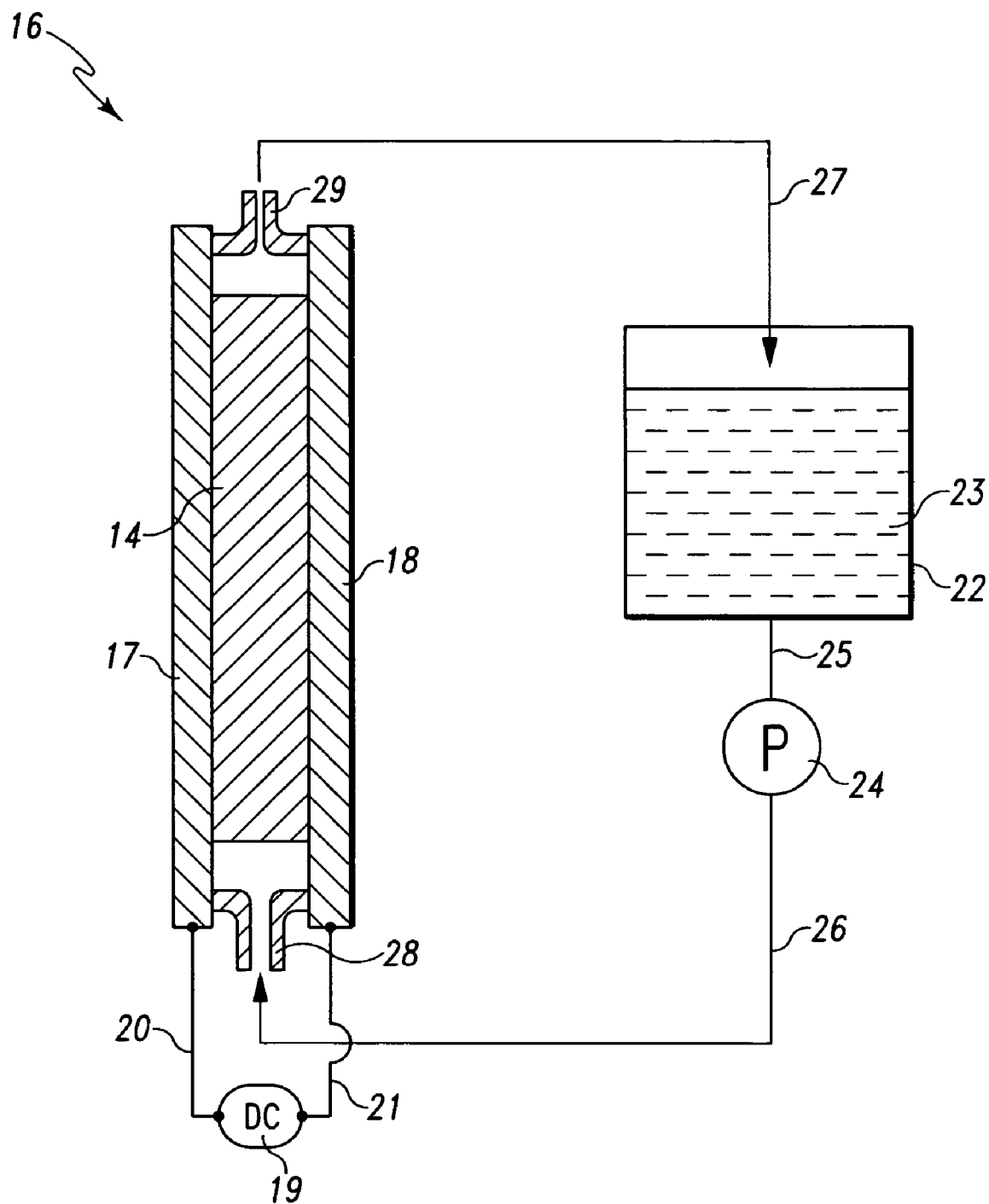
FIG. 4A is a schematic view of an apparatus for electrodepositing a metal in the interstitial spaces of a stretched porous polymer preform structure.

Referring now to FIG. 4A, therein is shown a schematic view of an electroforming apparatus 16 comprising a graphite cathode 17 and a graphite anode 18. A direct current power supply 19 is connected to the cathode 17 and the anode 18 by wires 20 and 21 respectively. The stretched preform structure 14 is shown with its contact area 15 in contact with the cathode 17. A reservoir 22 contains a nickel electroforming electrolyte 23 that is pumped via tube 25 to pump 24, through tube 26 into inlet 28, through the stretched preform structure 14, out of the outlet 29 and then back to the reservoir 22 by way of the tube 27. When the power supply 19 is turned on, nickel is electrolytically deposited progressively starting from the cathode 17 and extending toward the anode 18 to form a continuous network of nickel in the interstitial spaces of the stretched preform structure 14. The resulting product 30 is shown in FIG. 1D and is comprised of electrodeposited nickel 31 and polystyrene 32. The polystyrene 32 is then removed, for example by dissolution with a solvent or by heating to vaporize the polystyrene, to produce the porous nickel structure 33 shown in FIG. 1E having a continuous nickel phase intermingled with a continuous tortuous porous phase terminating at a surface 34 of the porous metal structure with anisotropic pores 35 having a maximum pore diameter 36 and a minimum pore diameter 37, the average ratio of the maximum pore diameter 36 to the minimum pore diameter 37 being about 2.

It should be understood that the stretched porous preform structure discussed above can be made using particles of any substantially electrically nonconductive elastic polymer as long as the particles can be made to sinter together by, for example, heating. Alternatively, it is contemplated that a stretched porous preform structure can be made by contacting a contained bed of polymer particles with a solvent that swells and softens the polymer of the particles so that they sinter together to form a porous preform structure that can then be stretched and dried of the solvent to form a stretched preform structure. The diameter (or range of diameters) of the polymer particles, degree of compression of the polymer particles and the degree of stretching of the sintered preform structure will determine the average ratio of the maximum pore diameter to the minimum pore diameter of the resulting porous metal structure as well as the absolute size of the pores.

For example, if 1 millimeter diameter plastic beads are used but they are compacted little, then the pore size at the surface of the metal structure of the instant invention will be relatively small (for example, 0.03 millimeters long by 0.01 millimeters wide) and the relative density of the structure will be about 0.4. But, if 1 millimeter diameter plastic beads are used and they are compacted significantly, then the pore size at the surface of the metal structure of the instant invention will be relatively larger (for example, 3 millimeters long and 0.3 millimeters wide) and the relative density of the structure will be relatively low, for example, 0.04. On the other hand, if 0.01 millimeter diameter plastic beads are used but they are compacted little, then the pore size at the surface of the metal structure of the instant invention will be relatively small (for example, 0.001 micrometers by 0.0001 micrometers) and the relative density of the structure will be about 0.4. But, if 0.01 millimeter diameter plastic beads are used and they are compacted significantly, then the pore size at the surface of the metal structure of the instant invention will be relatively larger (for example, 0.1 millimeters long and 0.001 millimeters wide) and the relative density of the structure will be relatively low, for example, 0.04.

Figure 2A:
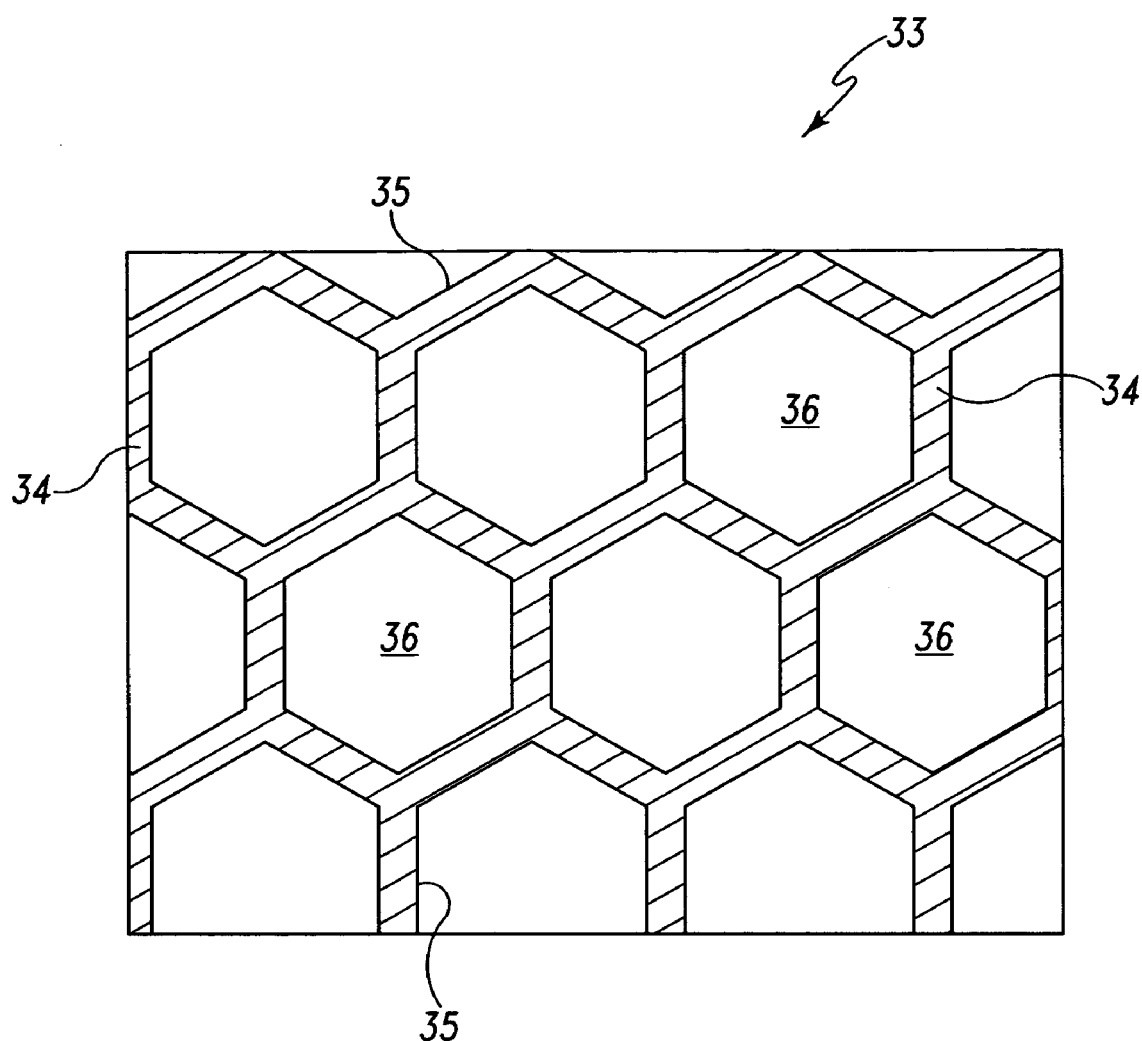
FIG. 2A is an idealized microscopic view of an open cell polyurethane foam structure compressed against its upper surface.
Figure 2B:
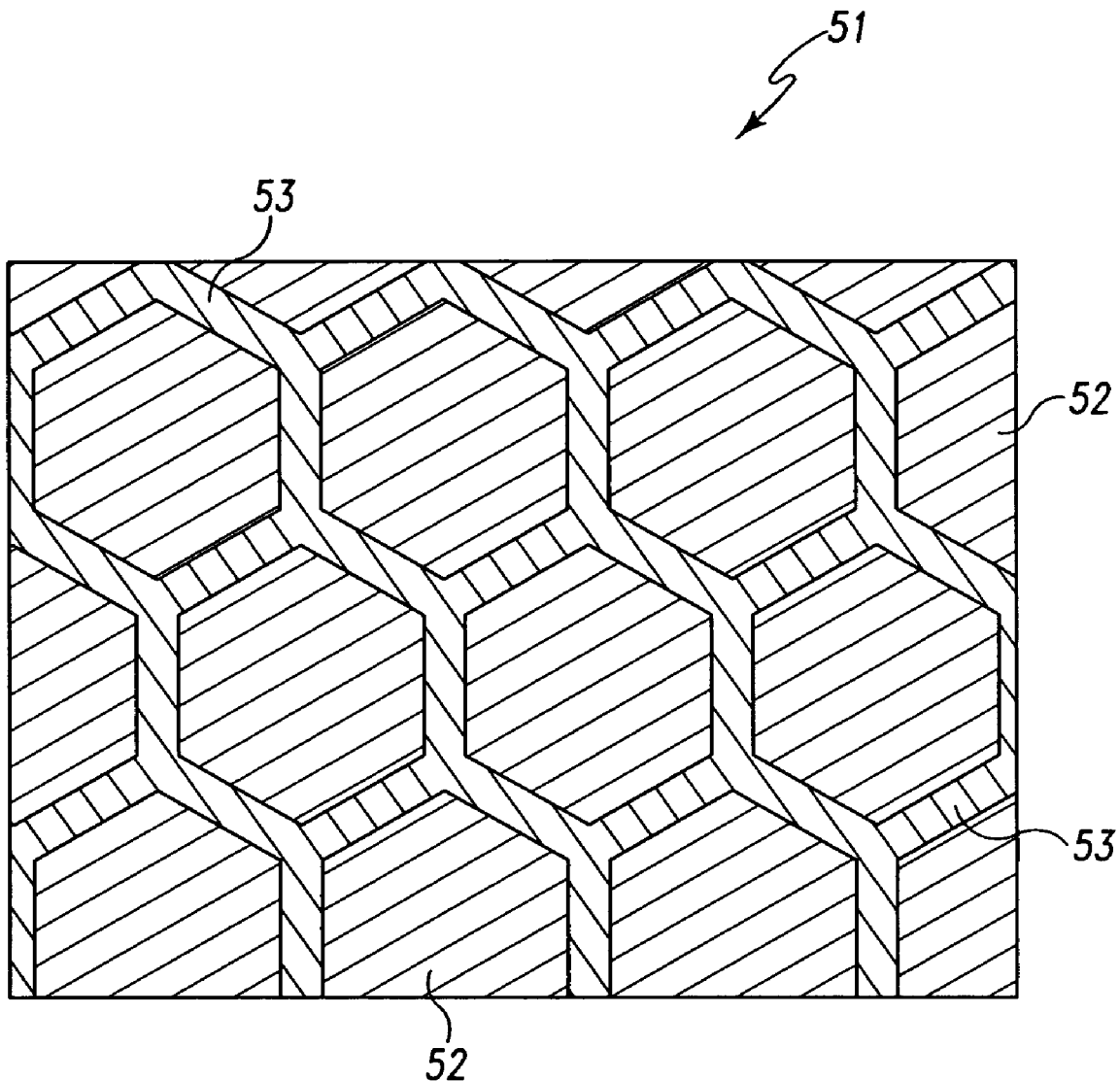
FIG. 2B is an idealized microscopic view of the foam structure of FIG. 2A, wherein the interstitial spaces of the structure are filled with an electrodeposited metal.
Figure 2C:
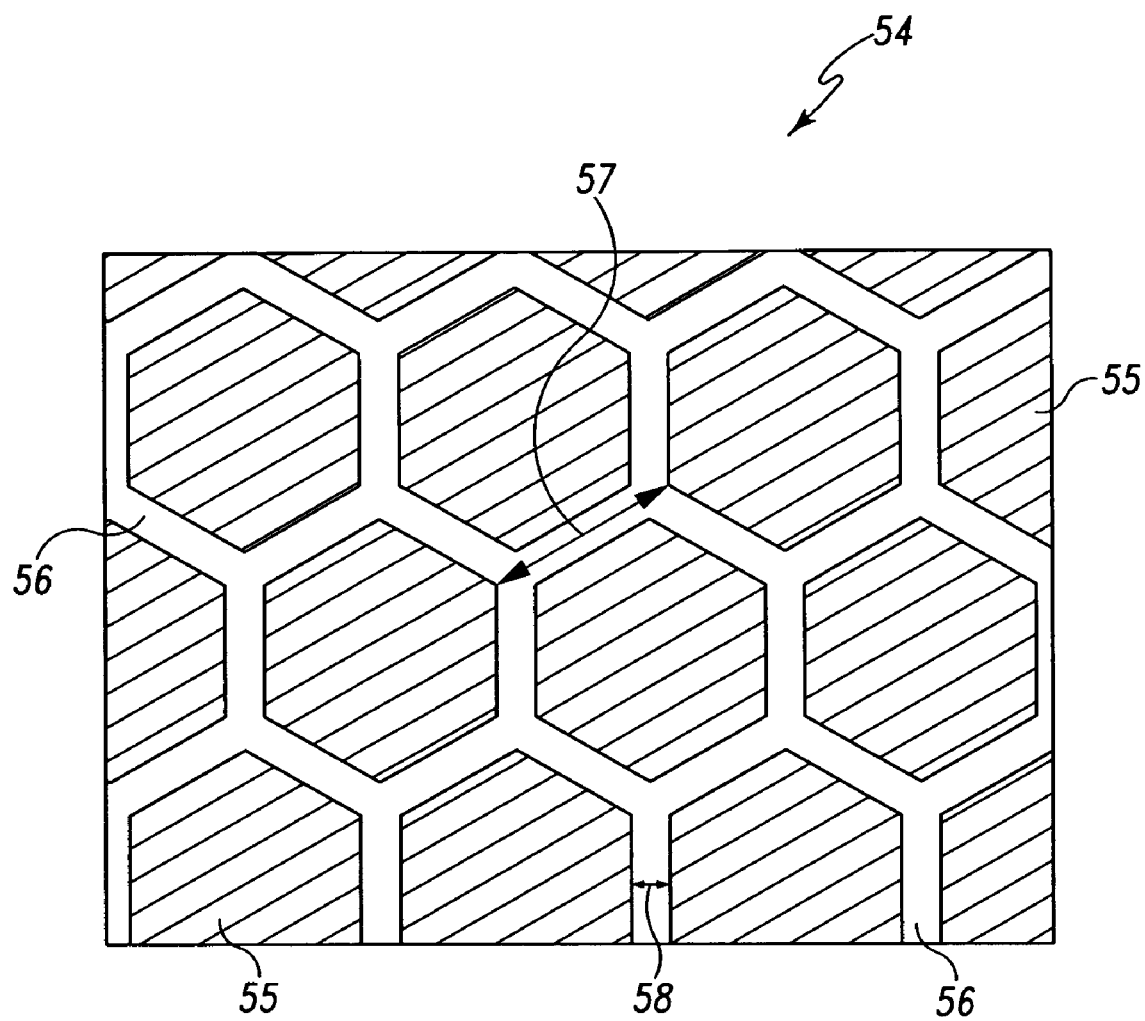
FIG. 2C is a microscopic view of the structure of FIG. 2B after removal of the polyurethane therefrom to produce a porous metal structure of the instant invention.
Figure 4B:
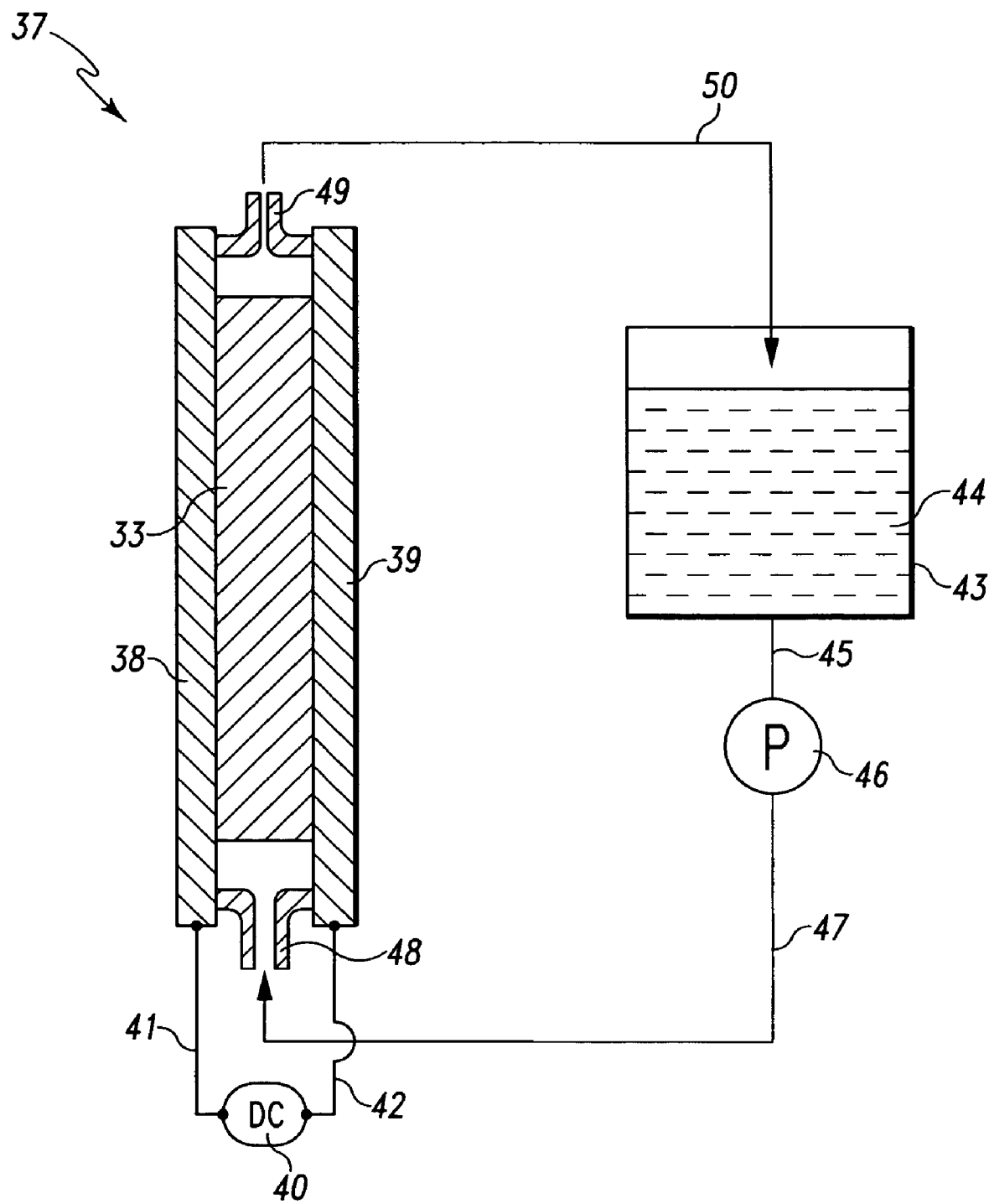
FIG. 4B is a schematic view of an apparatus for electrodepositing a metal in the interstitial spaces of a foamed polymer preform structure.

Referring now to FIG. 2A, therein is shown an idealized microscopic view of an open cell polyurethane foam structure 33 viewed through and compressed against a glass plate, not shown. The structure 33 is comprised of filaments of polyurethane 35, polygonal pores 36 and a flat surface 34. Referring now to FIG. 4B therein is shown a schematic view of an electroforming apparatus 37 comprising a graphite cathode 38 and a graphite anode 39. A direct current power supply 40 is connected to the cathode 38 and the anode 39 by wires 41 and 42 respectively. The open cell polyurethane foam structure 33 is shown with its surface 34 in compression contact with the cathode 38 to maximize contact of the filaments of polyurethane 35 of the structure 33 with the cathode 38. A reservoir 43 contains a nickel electroforming electrolyte 44 that is pumped via tube 45 to pump 46, through tube 47 into inlet 48, through the open cell polyurethane foam structure 33, out of the outlet 49 and then back to the reservoir 43 by way of the tube 50. When the power supply 40 is turned on, nickel is electrolytically deposited progressively starting from the cathode 38 and extending toward the anode 39 to form a continuous network of nickel in the pores 36 of the open cell polyurethane foam structure 33. The resulting product 51 is shown in FIG. 2B and is comprised of electrodeposited nickel 52 and polyurethane 53. The polyurethane 53 is then removed by heating to vaporize the polyurethane, to produce the porous nickel structure 54 shown in FIG. 2C having a continuous nickel phase intermingled with a continuous tortuous porous phase terminating at a surface 55 of the porous metal structure with anisotropic pores 56 having a maximum pore diameter 57 and a minimum pore diameter 58, the average ratio of the maximum pore diameter 57 to the minimum pore diameter 58 being about 6. Open cell polyurethane foam is preferred in the instant invention. Open cell polyurethane foam is commercially available from numerous commercial sources in various cell sizes and in various densities, for example, RHH Foam Systems, Inc., Cudahy, Wis.

Figure 3A:
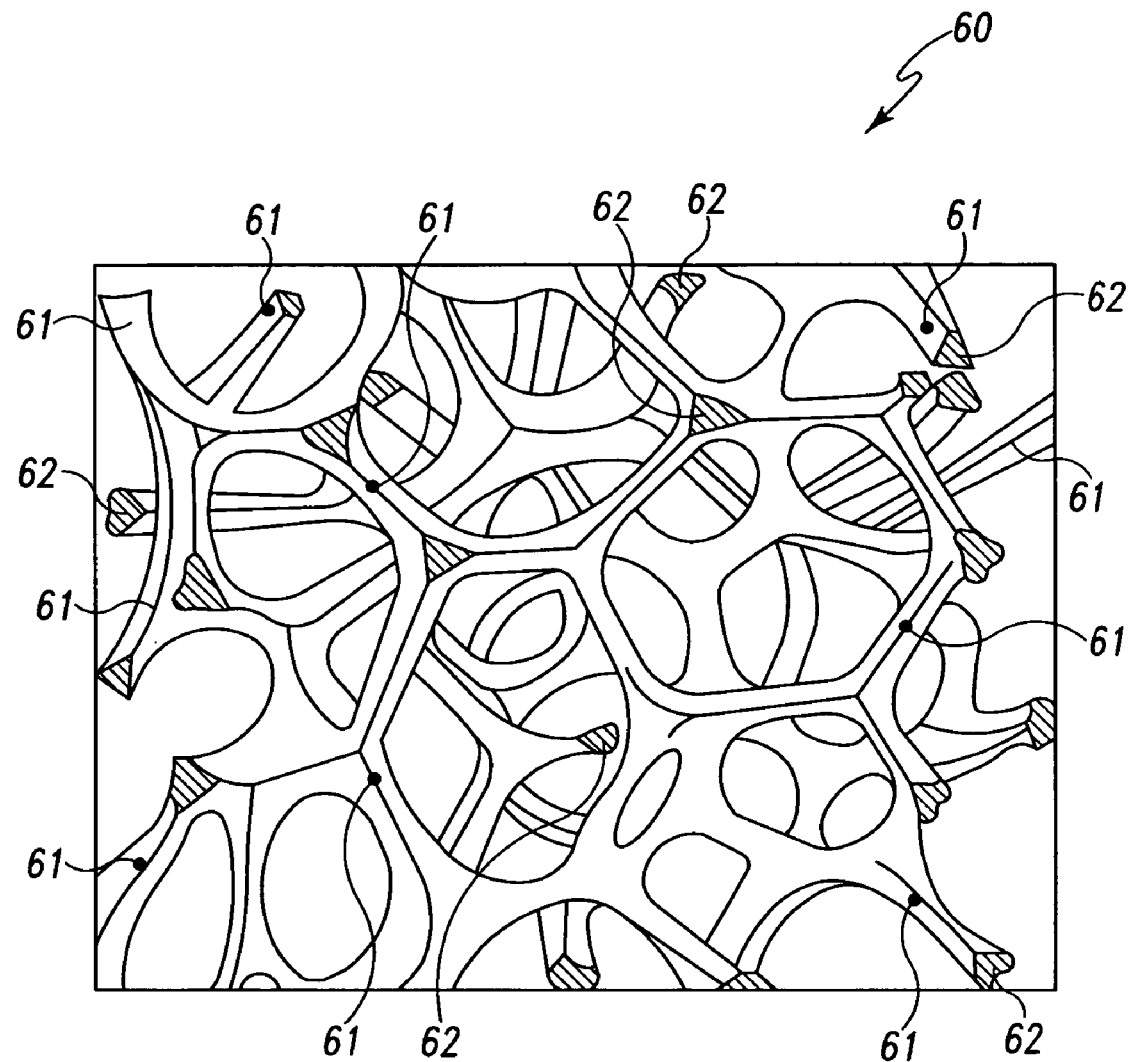
FIG. 3A is a microscopic view of an open cell polyurethane foam structure.
Figure 3B:
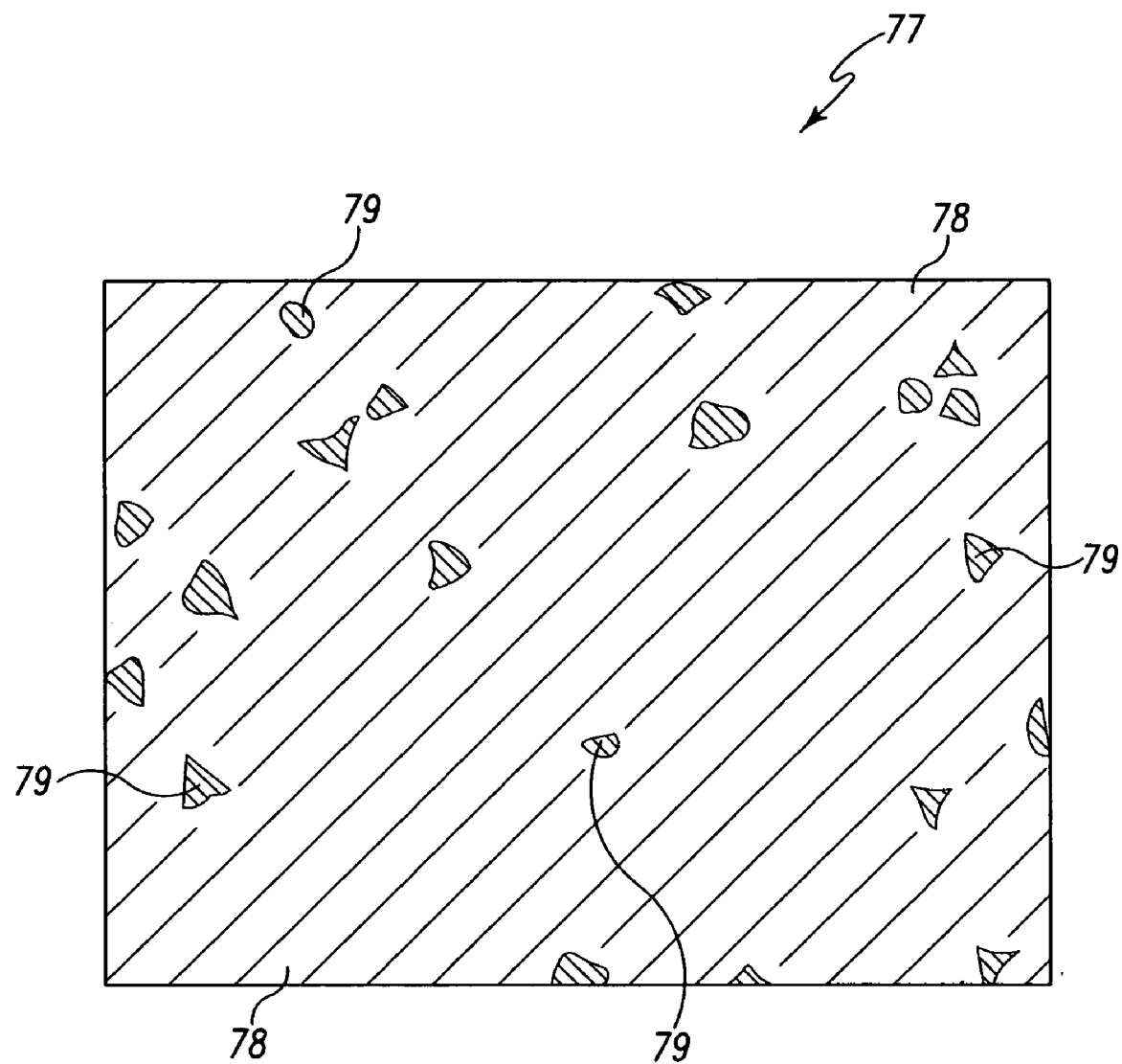
FIG. 3B is a microscopic view of the foam structure of FIG. 3A, wherein the interstitial spaces of the structure are filled with an electrodeposited metal.
Figure 3C:
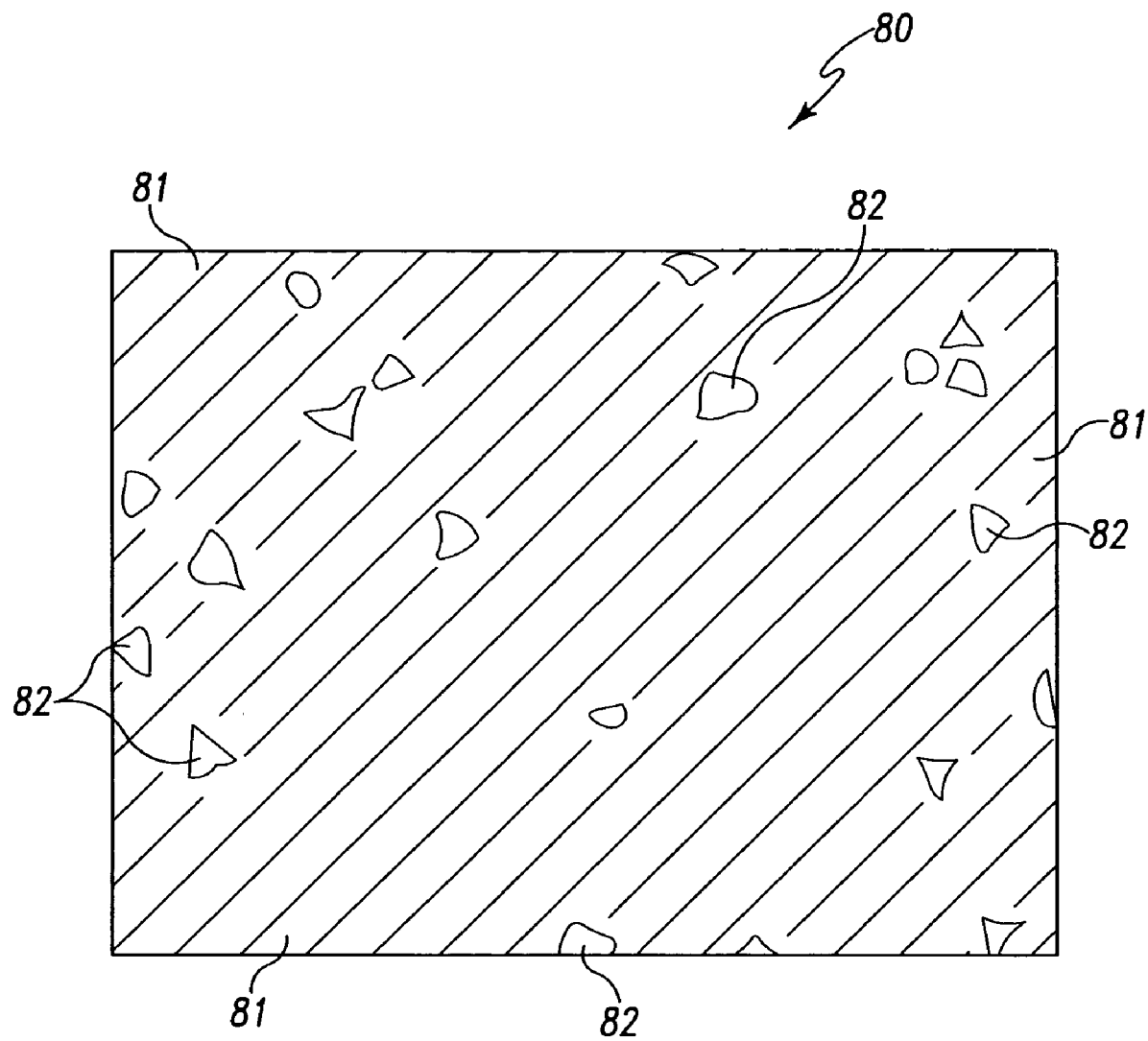
FIG. 3C is a microscopic view of the structure of FIG. 3B after removal of the polyurethane therefrom to produce a porous metal structure of the instant invention.
Figure 4C:
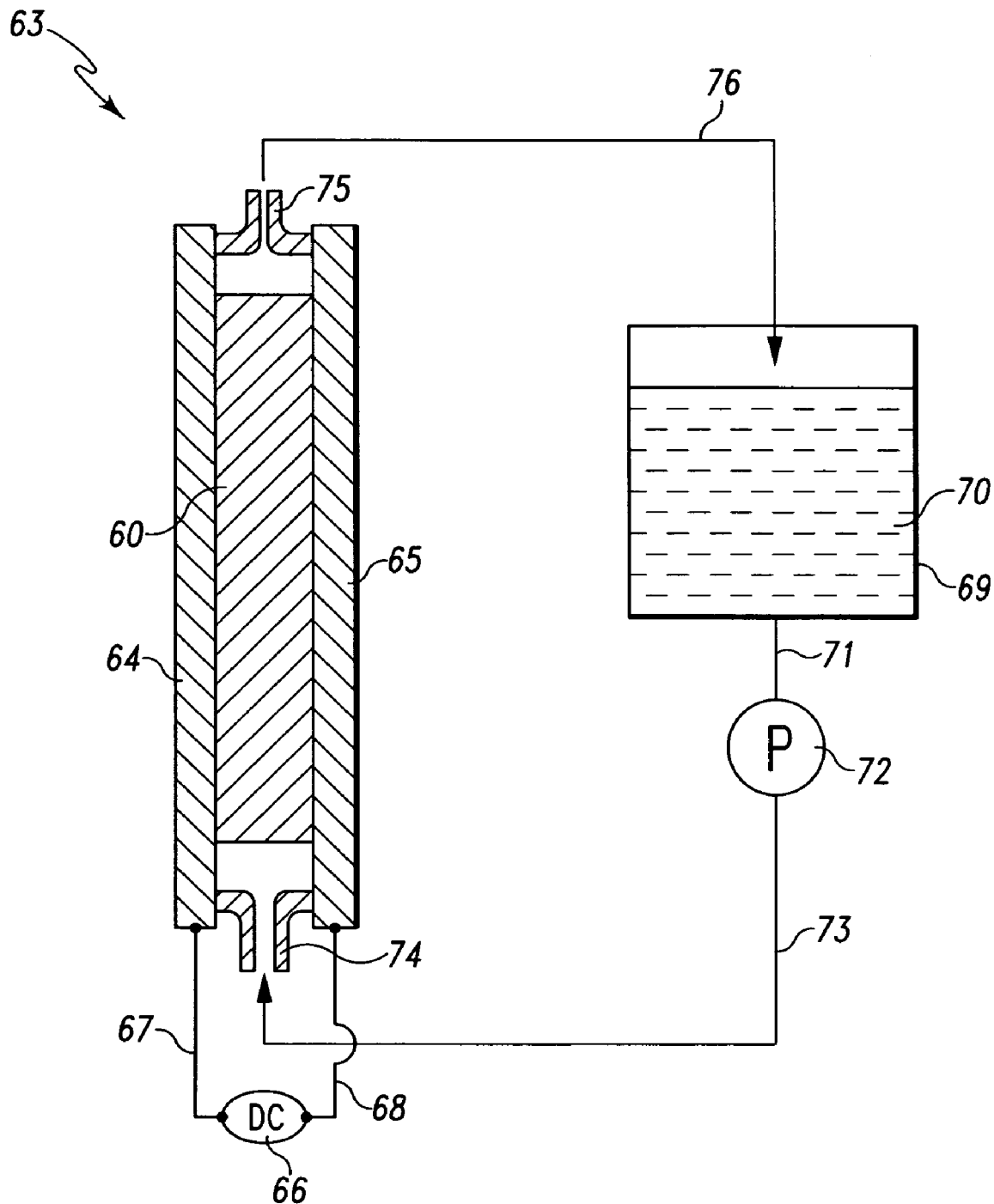
FIG. 4C is a schematic view of an apparatus for electrodepositing a metal in the interstitial spaces of another foamed polymer preform structure.

Referring now to FIG. 3A, therein is shown a realistic microscopic view of an open cell polyurethane foam structure 60. The structure 60 is comprised of filaments of polyurethane 61 terminating at an upper surface plane 62 thereof. Referring now to FIG. 4C therein is shown a schematic view of the electroforming apparatus 63 comprising a graphite cathode 64 and a graphite anode 65. A direct current power supply 66 is connected to the cathode 64 and the anode 65 by wires 67 and 68 respectively. The open cell polyurethane foam structure 60 is shown with its surface 62 in contact with (but not compressed against) the cathode 64. A reservoir 69 contains a nickel electroforming electrolyte 70 that is pumped via tube 71 to pump 72, through tube 73 into inlet 74, through the open cell polyurethane foam structure 66, out of the outlet 75 and then back to the reservoir 69 by way of the tube 76. When the power supply 66 is turned on, nickel is electrolytically deposited progressively starting from the cathode 64 and extending toward the anode 65 to form a continuous network of nickel in the pores of the open cell polyurethane foam structure 60. The resulting product 77 is shown in FIG. 3B and is comprised of electrodeposited nickel 78 and polyurethane 79. The polyurethane 79 is then removed by heating to vaporize the polyurethane, to produce the porous nickel structure 80 shown in FIG. 3C having a continuous nickel phase intermingled with a continuous tortuous porous phase terminating at a surface 81 of the porous metal structure with pores 82 thereinto. The size and topology of the continuous tortuous porous phase of the porous nickel structure 80 is essentially the same as the size and topology of the polyurethane filaments of the polyurethane foam used to make the structure 80.

Although polyurethane is the preferred polymer for the open cell polymer structure of the instant invention, it should be understood that any suitable open cell polymer can be used. The reticulated open cell polyurethane foam sold by Illbruck, Inc., of Minneapolis, Minn. is especially preferred in the instant invention when it is desired to produce a porous metal structure having a bulk density divided by the density of the metal that is relatively high (e.g., 0.99) and having relatively small pores.

The average ratio of the maximum pore diameter to the minimum pore diameter in one embodiment of the instant invention must be greater than 1.5. Preferably, the average ratio of the maximum pore diameter to the minimum pore diameter in the instant invention is greater than 2. More preferably, the average ratio of the maximum pore diameter to the minimum pore diameter in the instant invention is greater than 5. Most preferably, the average ratio of the maximum pore diameter to the minimum pore diameter in the instant invention is greater than 10.

The bulk density of the porous metal structure of the instant invention divided by the density of the metal can be higher than any prior art porous metal structure and can be made when an open cell foamed polymer is used in the instant invention. As discussed above, when reticulated polyurethane open cell polyurethane foam is used to make the porous metal structure of the instant invention, then the bulk density of the porous metal structure divided by the density of the metal can be about 0.99 or higher. Preferably, the bulk density of the porous metal structure of the instant invention divided by the density of the metal is greater than 0.9. More preferably, the bulk density of the porous metal structure of the instant invention divided by the density of the metal is greater than 0.95.

On the other hand, the bulk density of the porous metal structure of the instant invention divided by the density of the metal can be much less (e.g., 0.05 or less) and can be made when a stretched preform structure is used if the polymer particles of the structure are highly compressed. In this embodiment of the instant invention, the bulk density of the porous metal structure of the instant invention divided by the density of the metal is preferably less than 0.6.

The composition of the electroforming solution used in the instant invention is important. Such solution is preferably a solution known to form a smooth continuous electrodeposited metal deposit as is well known in the electroforming or electroplating art as a solution having good "throwing power". As a general teaching, reference can be made to text books on the subject of electroplating and electroforming such as Blum, Principles of Electroplating and Electroforming or Newman & Newman, Electroplating and Electroforming: A Guide for the Craftsman, to the publication "ELECTROFORMING" published by TechSolve Inc., Cincinnati Ohio, as well as to the ASTM publication B832-93(2003) Standard Guide for Electroforming with Nickel and Copper. Further information related to nickel nickel alloy electroforming is available from INCO Limited, Toronto, Canada.

Electroforming equipment and solutions are commercially available, for example, from Shor International Corporation, Mt. Vernon, N.Y. Electroformed Nickel, Inc. of Huntsville, Ala., offers, for example, electroforming equipment and personnel training on a turnkey basis. It should be understood that the term "metal" includes a pure metal (such as essentially pure nickel, copper or chromium) as well as an alloy (such as an alloy of nickel and chromium).

It should be understood that the substantially electrically nonconductive polymer particles or substantially electrically nonconductive open cell foamed polymer structure can have some small electrical conductivity and thus the term "substantially electrically nonconductive" means that the electrical current between the cathode and the anode of the electrodeposition cell is effective to electrolytically deposit the metal in the interstitial spaces of the particles or the foam. When the particles or foam have a conductivity greater than substantially electrically nonconductive, then so much of the current between the cathode and the anode of the electrodeposition cell is carried through the particles (or the polymer of the foam) that they (or the polymer of the foam) either overheat or the electrodeposition rate of the metal is too slow for utility. It should be understood that the term "pore diameter" used herein and in the claims, means the average diameter (as determined by microscopic examination of a representative area of the porous metal structure) of the holes or passageways into the structure at a surface of the porous metal structure.

When the bulk density of the porous metal structure of the instant invention divided by the density of the metal is relatively high, then the porous metal structure of the instant invention can be used as an oil lubricated porous metal journal bearing. The oil of such a bearing can be wicked into the porous metal structure or pressure fed from the exterior of the bearing. Since open cell polyurethane foam is available in tube shaped forms cut from bulk slabs, such bearings can be electroformed to net shape. Alternatively, the journal bore of such bearings can be machined to net shape to expose a surface not unlike the surface shown in FIG. 3C.

When the bulk density of the porous metal structure of the instant invention divided by the density of the metal is relatively high, then the porous metal structure of the instant invention can also be used as a continuous solid porous bed for liquid chromatography such as for Hydrodynamic Chromatography, see U.S. Pat. No. 5,935,429, by pumping a mobile phase through the continuous tortuous porous phase of the porous metal structure.

When the bulk density of the porous metal structure of the instant invention divided by the density of the metal is relatively low, then the porous metal structure of the instant invention can be used as a relatively high strength filter media having elongated pores. As discussed above, elongated pores are less subject to plugging. The high strength of the porous metal structure of this embodiment of the instant invention more readily permits the filter media to be vibrated or oscillated during the filtration process to further reduce pore plugging. It is believed that the porous metal structure of the instant invention will be especially useful for biological filtration applications such as filtering fermentor broths.

In conclusion, it is readily apparent that although the invention has been described in relation with its preferred embodiments, it should be understood that the instant invention is not limited thereby but is intended to cover all alternatives, modifications and equivalents that are included within the scope of the invention as defined by the following claims.

What is claimed is:

1. A method for making a porous metal structure comprising a continuous metal phase intermingled with a continuous tortuous porous phase terminating at a surface of the porous metal structure with anisotropic pores having a maximum pore diameter and a minimum pore diameter, the bulk density of the porous metal structure divided by the density of the metal being greater than 0.8, the average ratio of the maximum pore diameter to the minimum pore diameter being greater than 1.5, comprising the steps of: (a) placing an aqueous solution of an electrolyte in the interstitial spaces of a substantially electrically nonconductive open cell polymer foam, the electrolyte suitable for the electrolytic deposition of a metal; (b) positioning the open cell polymer foam containing the electrolyte in an electrolytic cell so that at least a portion of the open cell polymer foam containing the electrolyte is in compression contact with the cathode of the electrolytic cell; (c) applying a direct current potential between the anode of the electrolytic cell and the cathode of the electrolytic cell to electrolytically deposit a continuous network of metal in the interstitial spaces of the open cell polymer foam, the network being deposited progressively starting from the cathode of the electrolytic cell and extending toward the anode of the electrolytic cell to form a structure comprising a continuous metal phase and a continuous polymer phase; and (d) removing the polymer of the continuous polymer phase to form the porous metal structure.

2. A method for making a porous metal filter structure comprising a continuous metal phase intermingled with a continuous tortuous porous phase terminating at a surface of the porous metal structure with anisotropic pores having a maximum pore diameter and a minimum pore diameter, the average ratio of the maximum pore diameter to the minimum pore diameter being greater than 1.5, comprising the steps of: (a) compacting an array of substantially convex, substantially electrically nonconductive elastic particles of a polymer to sinter the particles together to form a porous preform structure defining interconnected interstitial spaces; (b) stretching the porous preform structure to more than 150 percent of its original length dimension to form a stretched preform structure; (c) placing an aqueous solution of an electrolyte in the interstitial spaces of the stretched preform structure, the electrolyte suitable for the electrolytic deposition of a metal; (d) positioning the stretched preform structure containing the electrolyte in an electrolytic cell so that at least a portion of the stretched preform structure containing the electrolyte is in contact with the cathode of the electrolytic cell; (e) applying a direct current potential between the anode of the electrolytic cell and the cathode of the electrolytic cell to electrolytically deposit a continuous network of metal in the interstitial spaces of the stretched preform structure, the network being deposited progressively starting from the cathode of the electrolytic cell and extending toward the anode of the electrolytic cell; and (f) removing the polymer of the continuous polymer phase to form the porous metal filter structure.

3. A method for making a porous metal structure comprising a continuous metal phase intermingled with a continuous tortuous porous phase, the bulk density of the porous metal structure divided by the density of the metal being greater than 0.8, comprising the steps of: (a) placing an aqueous solution of an electrolyte in the interstitial spaces of a substantially electrically nonconductive open cell polymer foam, the electrolyte suitable for the electrolytic deposition of a metal; (b) positioning the open cell polymer foam containing the electrolyte in an electrolytic cell so that at least a portion of the open cell polymer foam containing the electrolyte is in contact with the cathode of the electrolytic cell; (c) applying a direct current potential between the anode of the electrolytic cell and the cathode of the electrolytic cell to electrolytically deposit a continuous network of metal in the interstitial spaces of the open cell polymer foam, the network being deposited progressively starting from the cathode of the electrolytic cell and extending toward the anode of the electrolytic cell to form a structure comprising a continuous metal phase and a continuous polymer phase; and (d) removing the polymer of the continuous polymer phase to form the porous metal structure.

* * * * *